July 29, 1947.  B. BOGOSLOWSKY  2,424,540
APPARATUS FOR MAKING CONVOLUTE WOUND TUBING FROM SHEET MATERIAL
Filed Oct. 27, 1944  5 Sheets-Sheet 4
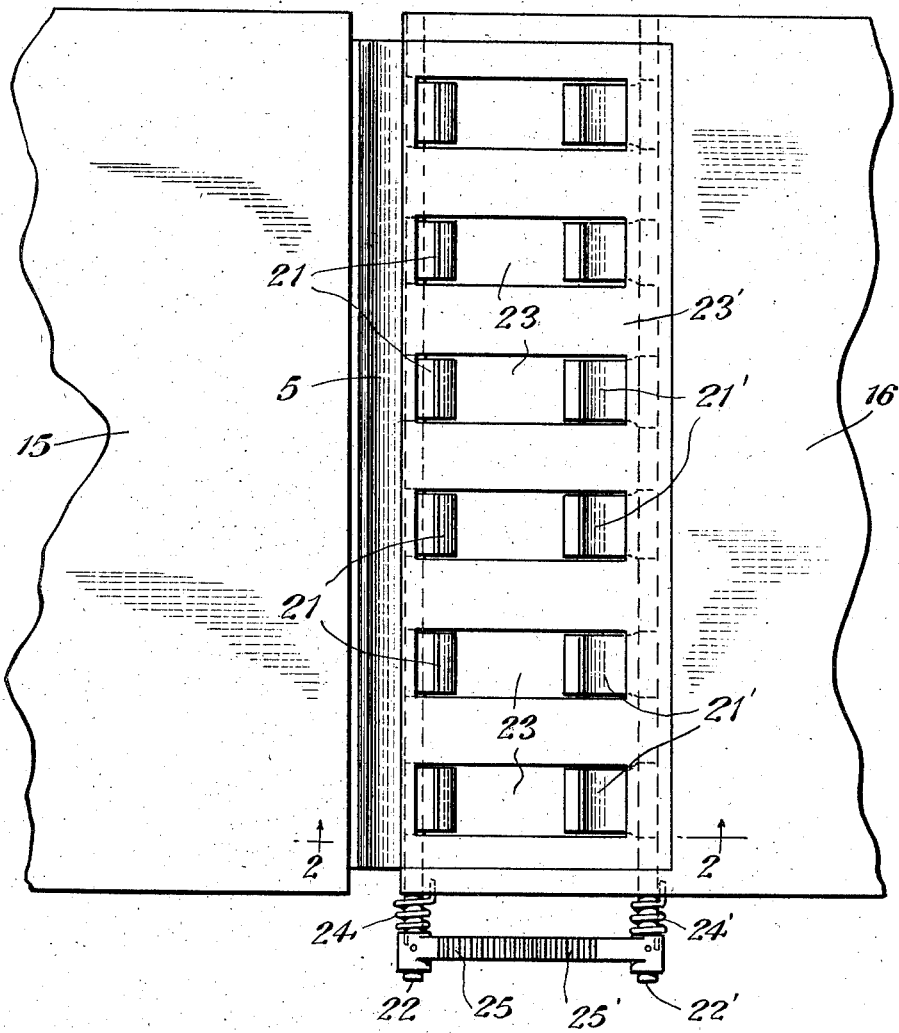

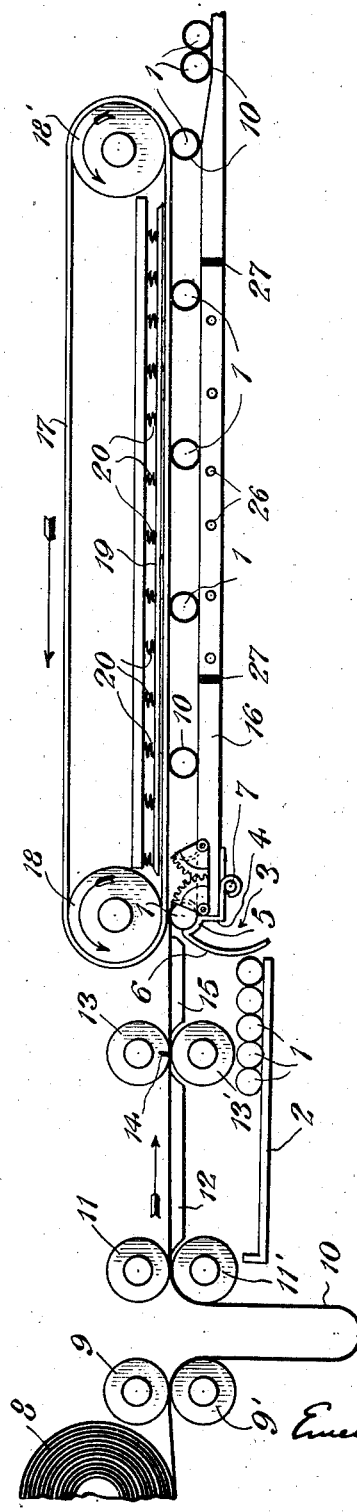

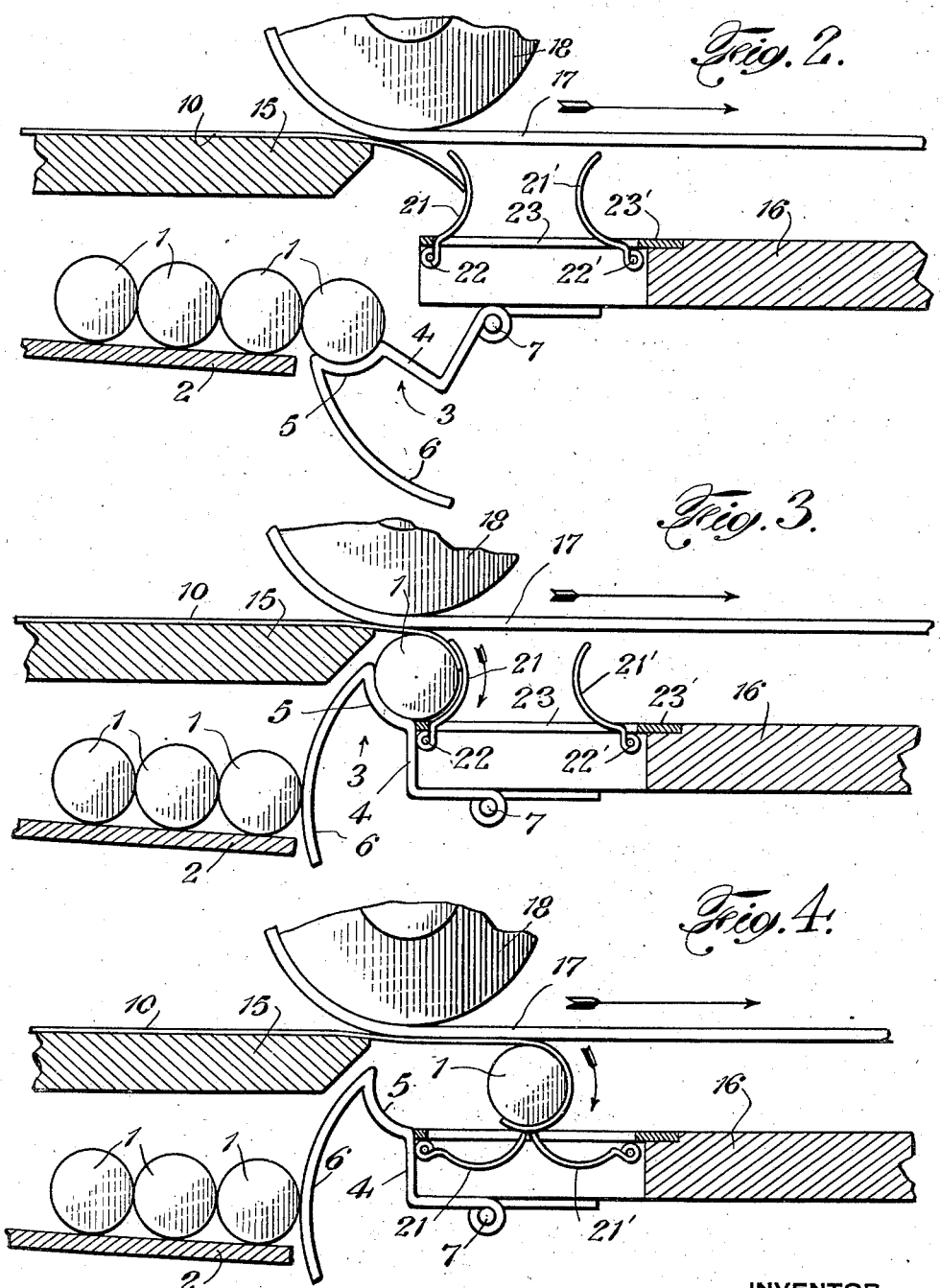

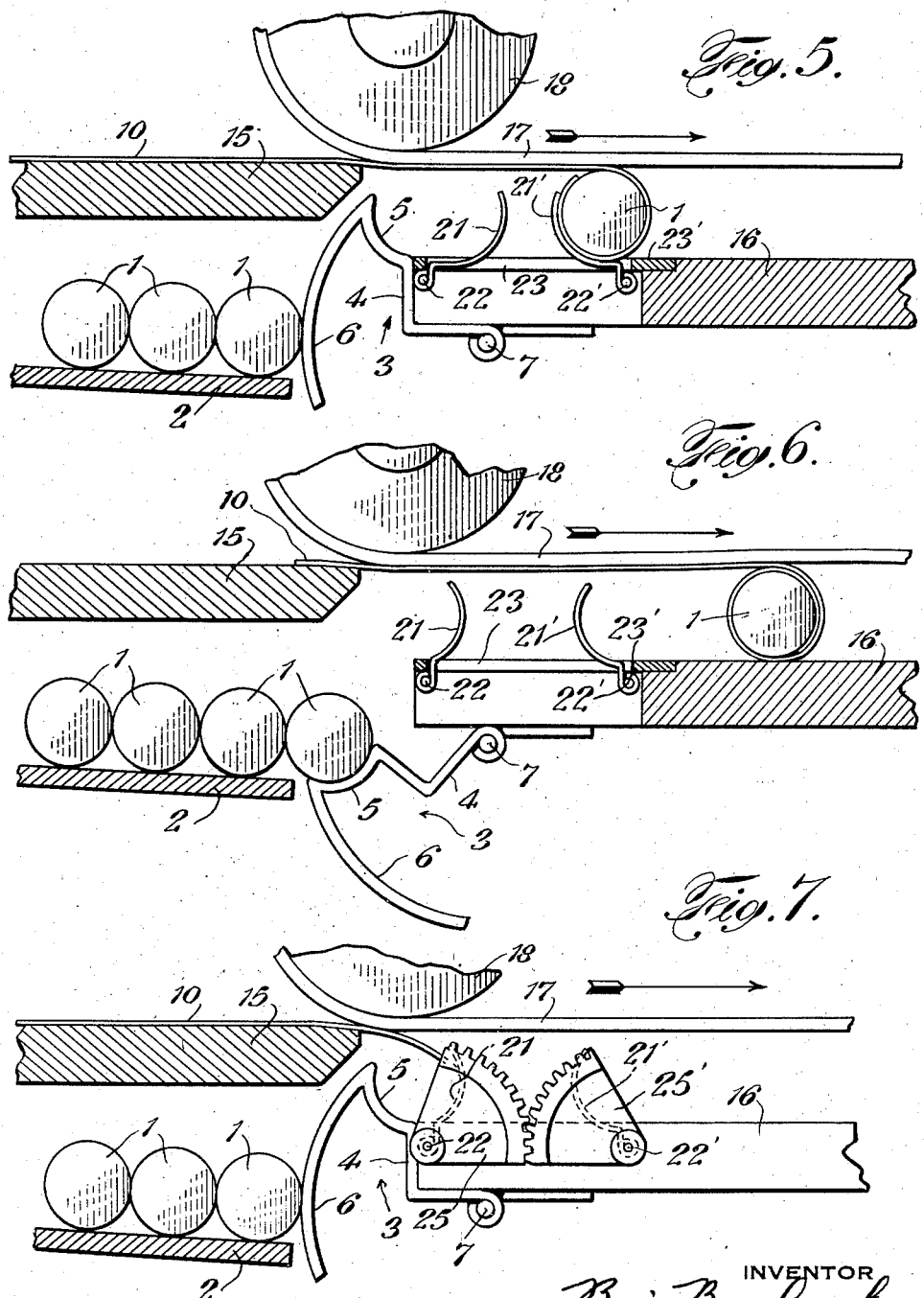

July 29, 1947.  B. BOGOSLOWSKY  2,424,540
APPARATUS FOR MAKING CONVOLUTE WOUND TUBING FROM SHEET MATERIAL
Filed Oct. 27, 1944  5 Sheets-Sheet 5

Patented July 29, 1947

2,424,540

UNITED STATES PATENT OFFICE 2,424,540

APPARATUS FOR MAKING CONVOLUTE WOUND TUBING FROM SHEET MATERIAL

Boris Bogoslowsky, Jackson Heights, N. Y.

Application October 27, 1944, Serial No. 560,705

12 Claims. (Cl. 93—81)

This invention relates to apparatus for making convolute wound tubing from sheet materials. More particularly the invention relates to making such tubing from sheets of thermoplastic or heat sealing materials or from sheets of non-thermoplastic materials coated or laminated with thermoplastic or heat sealing materials.

It is an object of the invention to provide apparatus for winding such tubing quickly and cheaply, and in the case of thermoplastic materials to provide for heat sealing the wound tubing.

Other objects and advantages of the invention will appear hereinafter.

A preferred embodiment of the invention selected for purposes of illustration is shown in the accompanying drawings, in which, Figure 1 is a side elevation of the apparatus.

Figure 2 is a section on the line 2—2 of Figure 8.

Figures 3, 4, 5 and 6 are similar sections showing successive stages of operation.

Figure 7 is a side elevation, partly in section, similar to Figure 2.

Figure 8 is a plan view of the feeding station.

Figure 9:
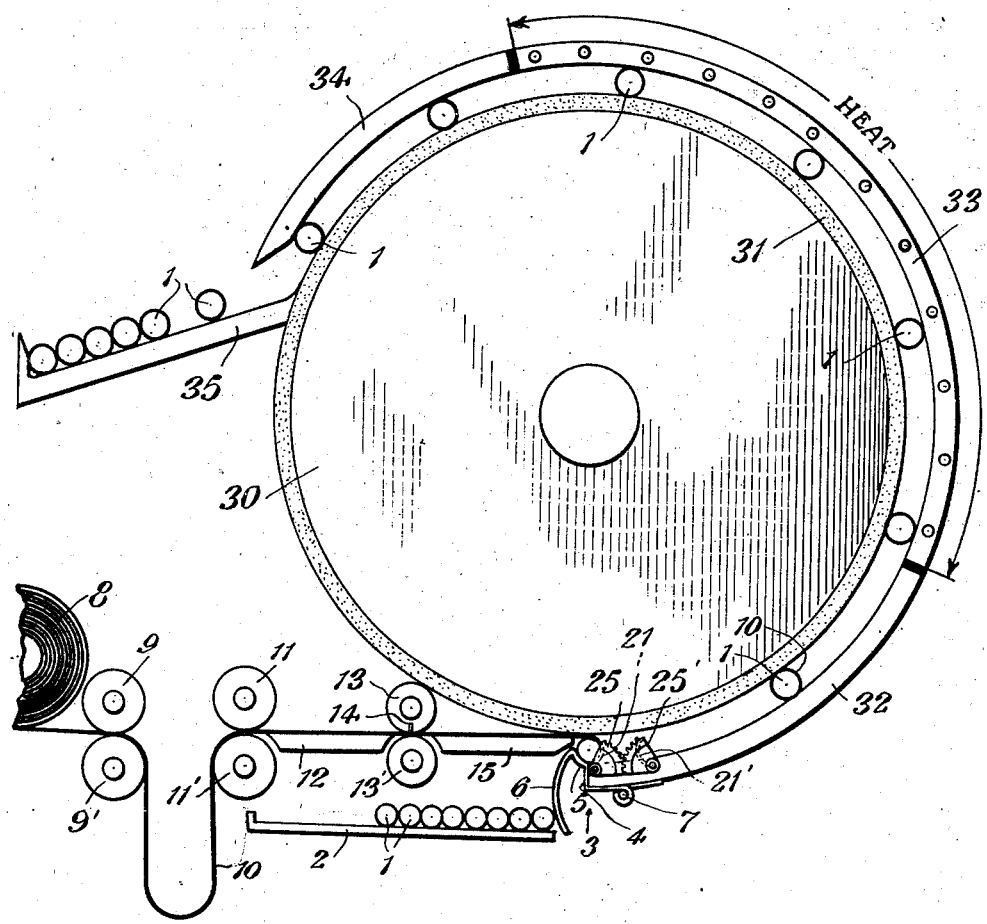
Figure 9 is a side elevation of a modified form of apparatus.

Referring to the drawings, I provide a plurality of mandrels 1 which serve as forms on which the tubing is wound convolutely. Said mandrels may be of any desired diameter and of any desired length, depending on the size of the tubing to be wound. Said mandrels may be cylindrical in shape, although I prefer to taper the mandrels very slightly in order to facilitate removal from the wound tubing. For example, in the case of a mandrel 8" long for making 1" diameter tubing in 6" lengths, if the outside diameter at one end of the mandrel is 1.001" and at the other end is .999", the taper is sufficient to permit easy removal. If desired, however, collapsible mandrels may be employed to facilitate removal.

A supply of such mandrels is placed on a shelf 2 having a slight incline to cause the mandrels to roll toward a feeding station designated generally by 3. At the feeding station a hinged mandrel feeding member 4 is provided, which said member has a trough 5 adapted to receive a single mandrel and to support it as it is raised to position to receive the sheet material for winding the same as hereinafter explained. Said member also has a guard flange 6 adapted to hold back the other mandrels while the first in line is being raised to winding position.

The sheet material to be wound may be fed to the winding position in any suitable manner, either automatically or by hand. For purposes of illustration I have shown a simple type of feed in which a continuous strip of sheet material is fed from a roll 8 by a pair of rollers 9, 9' which rotate continuously. The material is fed into a loop 10 from which it is withdrawn by a pair of feed rollers 11, 11' which preferably rotate intermittently to feed the material along a table 12 to another pair of feed rollers 13, 13', one of which carries a cutting knife 14 adapted to sever the continuous strip into sheets of the desired length. Each complete rotation of the rollers 13, 13' deposits a severed sheet of material of the required length on the table 15 in position for the beginning of the winding operation (see Figure 2). The rollers 13, 13' are connected to rotate with the rollers 11, 11', and both sets of rollers are rotated in timed relation with the operation of the feeding member 4.

The mandrel feeding member 4 is hinged at 7 to the end of a rolling table 16. Immediately above the rolling table is a driven rolling member in the form of a conveyor, comprising a belt 17 mounted on rollers 18, 18', with the lower stretch of the belt spaced from the table 16, with one end of the conveyor extending over the feeding and winding position so as to engage the mandrel when it is raised by the member 4. Preferably a shoe 19 engages the lower stretch of the belt and is pressed against the belt by springs 20 to hold the belt in engagement with the mandrel to cause the mandrel to roll along the table as hereinafter explained. The belt moves continuously to roll the mandrels continuously.

When the rollers 13, 13' have deposited a sheet of material in winding position as illustrated in Figure 2, the sheet remains stationary and is not advanced by the conveyor belt 18 until a mandrel is raised into winding position engaging the conveyor as illustrated in Figure 3. As soon as the mandrel is raised to winding position the sheet of material is gripped between the mandrel and the conveyor, the mandrel begins to roll and the winding of the tubing begins. It will be noted that the corner of the trough is flush with the surface of the rolling table so that the mandrel rolls smoothly from the member 4 onto the table.

After the mandrel has been raised to winding position as illustrated in Figure 3, and as the mandrel begins to roll, the leading end of the sheet is guided downwardly and circumferentially of the mandrel by a series of curved guide fingers 21 mounted at intervals along shaft 22 and projecting through slots 23 in the plate 23' which is flush with the surface of the table and forms a part thereof. As the mandrel rolls forwardly, the guide fingers continue to guide the material circumferentially of the mandrel, the guide fingers being gradually depressed into the slots 23 against the pressure of spring 24 (Figure 8).

Mounted on the end of shaft 22 is a gear segment 25 which meshes with gear segment 25' on shaft 22' which carries a series of curved guide fingers 21' which also project through slots 23. The fingers 21' are generally similar to fingers 21 but are faced in the opposite direction and are spaced from the fingers 21 in such manner that the end edges of opposed fingers substantially meet when in fully depressed position as shown in Figure 4. Due to the meshing gear segments, the two series of guide fingers 21 and 21' work together, the fingers 21' being depressed as the fingers 21 are depressed by the rolling mandrel. Therefore, when the mandrel arrives at the position shown in Figure 4, the fingers 21' are in position to continue to guide the material circumferentially as the mandrel continues to roll forwardly (Figure 5) so as to insure that the leading end of the material will enter the bight between the mandrel and the conveyor and will be tucked under the next succeeding convolution.

The mandrel is now rolled along the table 16 by the conveyor to complete the winding of the tubing (Figures 1 and 6), the rolling action of the conveyor in cooperation with the table being such as to cause the sheet material to tighten itself on the mandrel so that the tubing is wound very smoothly and tightly around the mandrel, such tightening of the material being due to the creep of the material as the mandrel is rolled between the two surfaces. At any suitable location along the table a heated surface may be provided by placing suitable heating elements (either electrical or steam) in passages 26, the heated section of the table being separated from the other portions by insulation 27. In the case of thermoplastic materials or in the case of non-thermoplastic materials coated or laminated with thermoplastic materials the temperature of the heated surface may be controlled to cause the plies of the tubing to be heat sealed throughout the circumference of the tubing, such sealing taking place, of course, while the material continues to be tightened on the mandrel by the rolling action as previously described.

The heated section of the table may be of any length required for sealing purposes, and after the mandrels are discharged by the conveyor they may be allowed to roll down the end of the table where the tubings are allowed to cool. Preferably the tubings are cooled substantially to room temperature before they are removed from the mandrels, as I find that the shrinkage which occurs while cooling produces tubings of superior quality both as to sealing and as to smoothness.

It will be understood that the operation of the intermittent feed rollers 11, 11' adn 13, 13' and the operation of the feeding member 4 may be controlled by hand or may be controlled automatically as desired, it being required only to observe the proper sequence of operations, i. e., the depositing of a sheet of material in winding position and then raising the mandrel to engage the sheet and the conveyor to start the winding operation. In fact, in an automatically controlled operation, if the timing of the movement of the feeding member 4 is controlled with sufficient accuracy, the rollers 11, 11' and 13, 13' may be operated continuously rather than intermittently.

In Figure 9, I have illustrated a modified form of apparatus in which the general plan of operation is the same as previously described, except that the driven rolling member is in the form of a cylindrical drum 30 having a yielding surface provided by covering the drum with suitable material such as rubber 31. The rolling table 32 is arcuate and concentric with the drum, the surface of the table being spaced from the surface of the drum to accommodate the mandrels as before. The table is provided with a heated section 33 as before and at the end of the heated section, the mandrels are discharged onto the trough 35. The other parts are constructed and operated as previously described and are given similar reference characters for convenience.

As an example of sheet materials which may be wound convolutely in the manner above described I would mention particularly metal foil, such as aluminum foil coated or laminated with thermoplastic material such as vinyl ester resins, cellulose acetate and the like, as there are many uses for tubings made of such materials. However the invention may be used for forming convolute wound tubings of various other sheet materials such as Cellophane, paper, etc.

It will be understood that the invention may be variously modified and embodied within the scope of the subjoined claims.

I claim as my invention:

1. Apparatus for making convolute wound tubing from sheet material, comprising, a mandrel, a stationary table, a driven rolling member spaced from said table to receive said mandrel therebetween, means for feeding said mandrel toward said rolling member to engage a sheet to be wound between said rolling member and said mandrel and to initiate rolling of said mandrel and the winding of said sheet around said mandrel, said rolling member extending along a substantial length of said table and serving to roll said mandrel from said feeding means onto and along said table to complete the winding of the sheet around the mandrel, and means to guide the end of said sheet circumferentially of said mandrel as said rolling member begins to roll said mandrel.

2. Apparatus for making convolute wound tubing from sheet material, comprising, a mandrel, a stationary table, a driven rolling member spaced from said table to receive said mandrel therebetween, means for feeding said mandrel toward said rolling member to engage a sheet to be wound between said rolling member and said mandrel and to initiate rolling of said mandrel and the winding of said sheet around said mandrel, said rolling member extending along a substantial length of said table and serving to roll said mandrel from said feeding means onto and along said table to complete the winding of the sheet around the mandrel, and spring pressed means engaging said mandrel successively as it is rolled along said table to guide the end of said sheet circumferentially of said mandrel to cause the end of said sheet to enter successively the bight between said mandrel and said table and the bight between said mandrel and said rolling member.

3. Apparatus for making convolute wound tubing from sheet material, comprising, a mandrel, a stationary table, a driven rolling member spaced from said table to receive said mandrel therebetween, means for feeding said mandrel toward said rolling member to engage a sheet to be wound between said rolling member and said mandrel and to initiate rolling of said mandrel and the winding of said sheet around said mandrel, said rolling member extending along a substantial length of said table and serving to roll said mandrel from said feeding means onto and along said table to complete the winding of the sheet around the mandrel, means to guide the end of said sheet circumferentially of said mandrel and to hold said sheet against said mandrel as it rolls forwardly until the end of said sheet is held between said mandrel and said table, and means to guide the end of said sheet circumferentially of said mandrel, and to continue to hold said sheet against said mandrel to guide the end of said sheet into the bight between said mandrel and said rolling member.

4. Apparatus for making convolute wound tubing from sheet material, comprising, a mandrel, a table, a driven rolling member spaced from said table to receive said mandrel therebetween, means for feeding said mandrel toward said rolling member to engage a sheet to be wound between said rolling member and said mandrel, said rolling member serving to roll said mandrel from said feeding means onto and along said table to wind the sheet around the mandrel, and yielding guide fingers mounted to guide the end of said sheet circumferentially of said mandrel as said rolling member rolls said mandrel, said guide fingers extending through slots in said table and being depressed through said slots by said mandrel to permit the mandrel to roll smoothly along the table.

5. Apparatus for making convolute wound tubing from sheet material, comprising, a mandrel, a table, a driven rolling member spaced from said table to receive said mandrel therebetween, means for feeding said mandrel toward said rolling member to engage a sheet to be wound between said conveyor and said mandrel, said rolling member serving to roll said mandrel from said feeding means onto and along said table to wind the sheet around the mandrel, two series of guide fingers mounted on said table, one series being curved toward said mandrel to engage said mandrel as it is rolled forwardly and to guide said material circumferentially of said mandrel and toward said table, and the other series being curved in the opposite direction to engage said mandrel as it continues to roll forwardly to guide said material circumferentially of said mandrel and into the bight between said mandrel and said rolling member.

6. Apparatus for making convolute wound tubing from sheet material, comprising, a mandrel, a table, a driven rolling member spaced from said table to receive said mandrel therebetween, means for feeding said mandrel toward said rolling member to engage a sheet to be wound between said conveyor and said mandrel, said rolling member serving to roll said mandrel from said feeding means onto and along said table to wind the sheet around the mandrel, and two oppositely disposed sets of curved spring pressed guide fingers mounted to engage said mandrel successively and to guide said sheet circumferentially of the mandrel as said rolling member rolls said mandrel, said guide fingers extending through slots in said table and being depressed through said slots by said mandrel to permit the mandrel to roll smoothly along the table, and means connecting said sets of guide fingers so that they operate together.

7. Apparatus for making convolute wound tubing from sheet material, comprising, a plurality of mandrels, a table, a driven rolling member spaced from said table to receive said mandrels therebetween, a shelf below said table to hold said mandrels, means for feeding said mandrels one by one from said shelf toward said rolling member to engage a sheet to be wound between said rolling member and each of said mandrels, and means to guide the end of each sheet circumferentially of each mandrel as said rolling member begins to roll each mandrel, said rolling member serving to roll each of said mandrels successively from said feeding means onto and along said table to wind a sheet around each mandrel.

8. In an apparatus for making convolute wound tubing from sheet material, in combination, a plurality of mandrels, a table, a driven rolling member spaced from said table to receive said mandrels therebetween, a shelf below said table to hold said mandrels, a mandrel feeding means hinged to said table, said mandrel feeding means having a trough adapted to receive one mandrel from said shelf and to hold said mandrel while said feeding means is swung upwardly to move said mandrel toward said rolling member, and said trough having a corner flush with said table across which said mandrel is rolled smoothly onto said table by said rolling member.

9. In an apparatus for making convolute wound tubing from sheet material, in combination, a plurality of mandrels, a table, a driven rolling member spaced from said table to receive said mandrels therebetween, a shelf below said table to hold said mandrels, a mandrel feeding means hinged to said table, said mandrel feeding means having a trough adapted to receive one mandrel from said shelf and to hold said mandrel while said feeding means is swung upwardly to move said mandrel toward said rolling member, said trough having a corner flush with said table across which said mandrel is rolled smoothly onto said table by said rolling member, and said mandrel feeding means having a section adapted to hold back the remaining mandrels while said feeding means is swung upwardly to move said mandrel into engagement with said rolling member.

10. Apparatus for making convolute wound tubing from sheet material consisting wholly or in part of thermoplastic or heat sealing material, comprising, a mandrel, a table, a driven rolling member spaced from said table to receive said mandrel therebetween, means for feeding said mandrel toward said rolling member to engage a sheet to be wound between said rolling member and said mandrel, means to guide the end of said sheet circumferentially of said mandrel as said rolling member begins to roll said mandrel, said rolling member serving to roll said mandrel from said feeding means onto and along said table to wind the sheet around the mandrel, and means for heating an intermediate section of said table located between two unheated sections to heat seal the tubing wound on said mandrel, said tubing being at least partially wound before reaching said heated section and being rolled along an unheated section after leaving said heated section.

11. Apparatus for making convolute wound tubing from sheet material consisting wholly or in part of thermoplastic or heat sealing material, comprising a mandrel, a table, a driven rolling member spaced from said table to receive said mandrel therebetween and roll the same along said table to wind a sheet of material around said mandrel, means to guide the end of said sheet circumferentially of said mandrel as said rolling member begins to roll said mandrel, and means for heating an intermediate section of said table located between two unheated sections to heat seal the tubing wound on said mandrel, said tubing being at least partially wound before reaching said heated section and being rolled along an unheated section after leaving said heated section.

12. Apparatus for making convolute wound tubing from sheet material, comprising a mandrel, a stationary, arcuate table, a cylindrical driven drum mounted coaxially with said table and spaced radially therefrom to receive said mandrel therebetween, means for feeding said mandrel toward said drum to engage a sheet to be wound between said drum and said mandrel and to initiate rolling of said mandrel and the winding of said sheet around said mandrel, and means to guide the end of said sheet circumferentially of said mandrel as said rolling member begins to roll said mandrel, said drum serving to roll said mandrel from said feeding means onto and along said arcuate table to complete the winding of said sheet around the mandrel.

BORIS BOGOSLOWSKY.

REFERENCES CITED

The following references are of record in the file of this patent:

FOREIGN PATENTS

| Number | Country | Date |
|---|---|---|
| 401,315 | Germany | Sept. 2, 1924 |
| 511,181 | Germany | Oct. 27, 1930 |
| 446,210 | Great Britain | Apr. 27, 1936 |